US010493453B2

(12) United States Patent
Wright

(10) Patent No.: US 10,493,453 B2
(45) Date of Patent: Dec. 3, 2019

(54) MECHANICAL ACTUATOR SYSTEM AND METHOD OF ACTUATION OF A DIAGNOSTIC DEVICE THEREWITH

(71) Applicant: David W. Wright, Littleton, CO (US)

(72) Inventor: David W. Wright, Littleton, CO (US)

( * ) Notice: Subject to any disclaimer, the term of this patent is extended or adjusted under 35 U.S.C. 154(b) by 353 days.

(21) Appl. No.: 15/453,606

(22) Filed: Mar. 8, 2017

(65) Prior Publication Data

US 2017/0259268 A1 Sep. 14, 2017

Related U.S. Application Data

(60) Provisional application No. 62/305,278, filed on Mar. 8, 2016.

(51) Int. Cl.
*B01L 3/00* (2006.01)
*G01N 1/38* (2006.01)

(52) U.S. Cl.
CPC ..... *B01L 3/50273* (2013.01); *B01L 3/502738* (2013.01); *B01L 2300/0816* (2013.01); *B01L 2300/0867* (2013.01); *B01L 2400/0481* (2013.01); *B01L 2400/0683* (2013.01)

(58) Field of Classification Search
CPC ............. B01L 2300/18; B01L 2200/16; B01L 2400/041; B01L 7/5255; B01L 2400/0683; G01N 1/312
See application file for complete search history.

(56) References Cited

U.S. PATENT DOCUMENTS 4,589,540 A * 5/1986 Kampf ...................... G01T 7/02 198/346.2
4,662,756 A * 5/1987 Duran, Jr. .............. G01D 5/341 250/559.36
5,600,068 A * 2/1997 Kessler .................. G01N 29/26 73/620
5,650,332 A * 7/1997 Gao ..................... G01N 1/2813 427/2.11
5,762,873 A * 6/1998 Fanning .................... B01L 3/50 422/63
5,985,214 A * 11/1999 Stylli ....................... B01J 19/00 422/63
6,627,446 B1 * 9/2003 Roach ............. G01N 27/44704 204/451

(Continued)

*Primary Examiner* — Brian R Gordon
(74) *Attorney, Agent, or Firm* — John D. Wright; Dickinson Wright PLLC

(57) ABSTRACT

A mechanical actuator system for performing an assay on a disposable diagnostic cartridge having a plurality of fluid-containing blisters includes a body configured to carry the disposable diagnostic cartridge in stationary relation thereon. A lead screw is operably supported by the body and a drive motor is operably connected to the lead screw. A carriage is threadedly coupled to the lead screw, with the carriage having upper and lower wall spaced from one another. A roller is operably carried by the upper wall of the carriage. The roller is spaced from the lower wall for passage of the diagnostic cartridge between the roller and the lower wall. A driven gear is operably coupled to the roller in meshed engagement with the lead screw. Actuation of the drive motor causes the lead screw to rotate, thereby translating the carriage along the lead screw and concurrently causing the driven gear to rotate the roller.

13 Claims, 6 Drawing Sheets

(56) References Cited

U.S. PATENT DOCUMENTS

| | | | | |
|---|---|---|---|---|
| 6,866,461 | B2 * | 3/2005 | DeWinter | B01L 3/50853<br>414/222.07 |
| 7,208,124 | B2 * | 4/2007 | Elverd | B01L 3/0244<br>422/510 |
| 9,598,722 | B2 * | 3/2017 | Wright | B01F 7/00116 |
| 10,001,494 | B2 * | 6/2018 | Wan | A61B 10/0038 |
| 10,005,080 | B2 * | 6/2018 | Kayyem | B01L 3/502 |
| 2002/0009391 | A1 * | 1/2002 | Marquiss | B01L 3/50853<br>422/63 |
| 2003/0180128 | A1 * | 9/2003 | DeWinter | B01L 3/50853<br>414/222.07 |
| 2004/0096984 | A1 * | 5/2004 | Elverd | B01L 3/0244<br>506/33 |
| 2007/0202018 | A1 * | 8/2007 | Chu | B01L 9/523<br>422/505 |
| 2008/0038129 | A1 * | 2/2008 | Higuchi | B01L 3/021<br>417/477.2 |
| 2016/0266150 | A1 * | 9/2016 | Wan | A61B 10/0038 |

* cited by examiner

MECHANICAL ACTUATOR SYSTEM AND METHOD OF ACTUATION OF A DIAGNOSTIC DEVICE THEREWITH

CROSS-REFERENCE TO RELATED APPLICATION

This application claims the benefit of U.S. Provisional Application Ser. No. 62/305,278, filed Mar. 8, 2016, which is incorporated herein by way of reference in its entirety.

BACKGROUND

1. Technical Field

This invention relates generally to in-vitro diagnostics, and more particularly to disposable diagnostic cartridges and apparatus and methods for controlling the functions required to execute an assay on a diagnostic cartridge.

2. Related Art

Diagnostic tests are increasingly being used to determine the state or condition of a biological environment, such as in human healthcare, agriculture, livestock management, municipal systems management, and national defense, by way of example and without limitation. A new market is emerging wherein diagnostic tests are being performed at the point-of-care. The diagnostic test can be complex, requiring multiple fluids and multiple steps to execute an assay. An assay is a sequence of steps or procedures used to measure the presence or absence of a substance in a sample, the amount of a substance in a sample, or the characteristics of a sample. An example of a common and relatively simple point-of-care assay, which can be readily conducted by a layperson, is a blood glucose test. In this test, generally speaking, the blood is mixed with glucose oxidase, which reacts with the glucose in the sample, creating gluconic acid, wherein the gluconic acid reacts with a chemical, typically ferricyanide, producing ferrocyanide. Current is passed through the ferrocyanide and the impedance reflects the amount of glucose present.

Although the aforementioned blood glucose assay is relatively common and simple, many assays are far more complex, in that they require specific fluids, often of differing types and quantities, to be stored and maintained separate from one another for future use on the diagnostic device. These fluids may be, but are not limited to, a buffer solution for dilution, fluids containing antibodies and antigens, microspheres coated with binding agents, cell lysing agents, and other fluids required to manipulate the sample being tested. Diagnostic tests that utilize millifluidic and microfluidic volumes of the fluids are intended to provide an incredibly high degree of specificity, sensitivity, and a precise volume and rate of fluid delivery to achieve as accurate a test result as possible. Nearly all microfluidic tests require the introduction of fluids, control of flow, mixing of fluids and other interactive functions throughout the assay sequence to manipulate the sample being tested and to produce an accurate diagnosis.

Typically, consumable diagnostic devices, meaning the diagnostic device is disposable upon being used, require a complex companion durable hardware device that interfaces with the consumable diagnostic device to execute the test. The durable hardware performs many functions, one of which is to facilitate dispensing the fluids contained in a reservoir or reservoirs on the consumable diagnostic device into microfluidic or millifluidic channels formed within the consumable diagnostic device. Fluids may be contained within a deformable vessel, comprised of a malleable material, typically made from aluminum or a thin foil. Dispensing the fluid from the deformable vessel(s) typically proves challenging to attain the desired flow, including volume and rate of flow. Upon being urged to flow out of the reservoirs, the fluids can flow into a specimen containing reaction chamber. The introduction of the fluids to the reaction chamber requires precision; including flow rate, volume and timing, so as to best replicate the laborious protocols of a laboratory, where precession pipettes are employed. This continues to prove difficult in point-of-care diagnostic devices.

Diagnostic assays requiring fluid management require precise opening and dispensing of fluid from reservoirs, opening and closing of valves, pumping and mixing of fluids and may include the introduction of sensors, including, such as optic, thermal, electrical and magnetic devices used in the preparation and analysis of the diagnostic assay. Regardless, attaining the desired precision; including flow rate, volume and timing, so as to best replicate the protocols of a laboratory continues to prove challenging, particularly if the assay is complex.

Another function performed in diagnostic assays involves the capture and release of chemically and biologically tagged ferrous beads. Ferrous beads are commonly used to facilitate the capture and release and handling of target elements. The fluid containing the target element is combined with a ferrous bead containing a receptor, or tag. The bead binds or links with the target element, at which point a magnet is moved into close proximity to the beads, thereby immobilizing the beads within a chamber or zone. A rinse fluid flushes away the non-specific elements, leaving the target elements bound to the beads. At this stage the magnet may be released, allowing the beads to pass to a different zone on the consumable device, thus allowing subsequent processing. This action requires movement of the magnets, which if not conducted properly, can have an adverse impact on the test results.

Another function performed in diagnostic assays involves not only the pumping or movement of fluids, but also the mixing of fluids, which again, if not performed precisely, can have an adverse impact on the test results.

SUMMARY OF THE INVENTION

In accordance with one aspect of the invention, a mechanical actuation system is provided including a linearly actuated carriage that interfaces with a disposable, point-of-care diagnostic cartridge. The carriage receives a rotatable drive screw which is operably coupled to a drive motor. The carriage traverses along the drive screw and is stabilized by a guide member during rotation of the drive screw by providing and anti-rotation force counter to the direction of drive screw rotation. The carriage interfaces with the diagnostic cartridge via an interface mechanism while being linearly translated along the drive screw via selective rotation of the drive screw. The interface mechanism includes at least one elongate roller configured to compress one or more fluid containing features on the diagnostic cartridge. The position and rate of linear translation of the carriage and the at least one roller operably carried thereby provide precise control over the attributes associated with dispensing the fluid from the one or more fluid-containing features, including volume, flow rate and timing.

In accordance with another aspect of the invention, at least one of the fluid containing features can include a selectively rupturable fluid-containing blister.

In accordance with another aspect of the invention, the roller can be rotated at a selected rotational speed by a driven member operably coupled to the roller.

In accordance with another aspect of the invention, the roller and the driven member can be fixed to a common shaft for conjoint rotation with the shaft.

In accordance with another aspect of the invention, the driven member can be provided as a gear coupled in meshed engagement with the drive screw.

In accordance with another aspect of the invention, the carriage can include a support mechanism that provides support to the diagnostic consumable counteracting the compressive force imparted by the roller.

In accordance with another aspect of the invention, the carriage can include a mechanism which activates an opening mechanism contained on the diagnostic consumable.

In accordance with another aspect of the invention, the carriage can include a mechanism that opens and closes valves on the diagnostic consumable.

In accordance with another aspect of the invention, the carriage can include a mechanism that moves a magnetic member with respect to key locations on the diagnostic consumable.

In accordance with another aspect of the invention, the carriage can include a mechanism which interfaces with a pump on the diagnostic consumable.

In accordance with another aspect of the invention, the system can include a plurality of linearly translatable carriages configured to interface with a diagnostic cartridge, wherein the cartridges can be configured to move in the same and/or different directions relative to one another.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
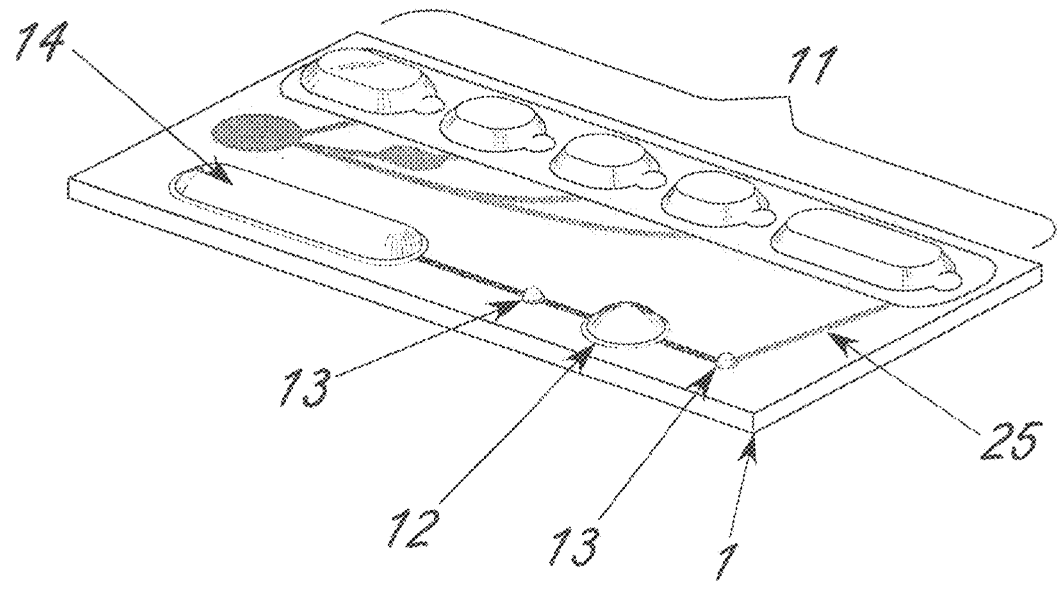
FIG. 1 is a perspective view of a diagnostic cartridge including fluid storage reservoir(s), linear pump(s), fluid mixing chamber(s) and valve(s)

Referring in more detail to the drawings, FIG. 1 illustrates a disposable diagnostic cartridge, also referred to as diagnostic device or apparatus, and more simply referred to hereafter as apparatus 1, shown in accordance with one example, which includes a plurality of fluid-containing blisters 11. The apparatus 1 includes features for introducing fluid from the blisters 11 to fluid channels 25, wherein the fluid channels 25 direct the fluid to functional areas on the apparatus 1. The apparatus 1 further includes features operable as flow control valves 13, operable to stop, start and direct the flow of fluid between functional areas on the apparatus 1; features operable as mixing chambers 12, operable to mix fluids, such as upon depression of a linear elastic pump 14, and features providing controlled, selective directional flow of the fluid upon actuation. The apparatus 1, including a plurality or all of the aforementioned features and attributes, and optionally other ancillary components, which will be readily appreciated by one skilled in the art, when used in combination with a mechanical actuator system, referred to hereafter as actuator system 32, constructed in accordance with one aspect of the invention, provides an ability to execute a complex diagnostic assay in a quick, efficient, and reliable manner.

Figure 2:
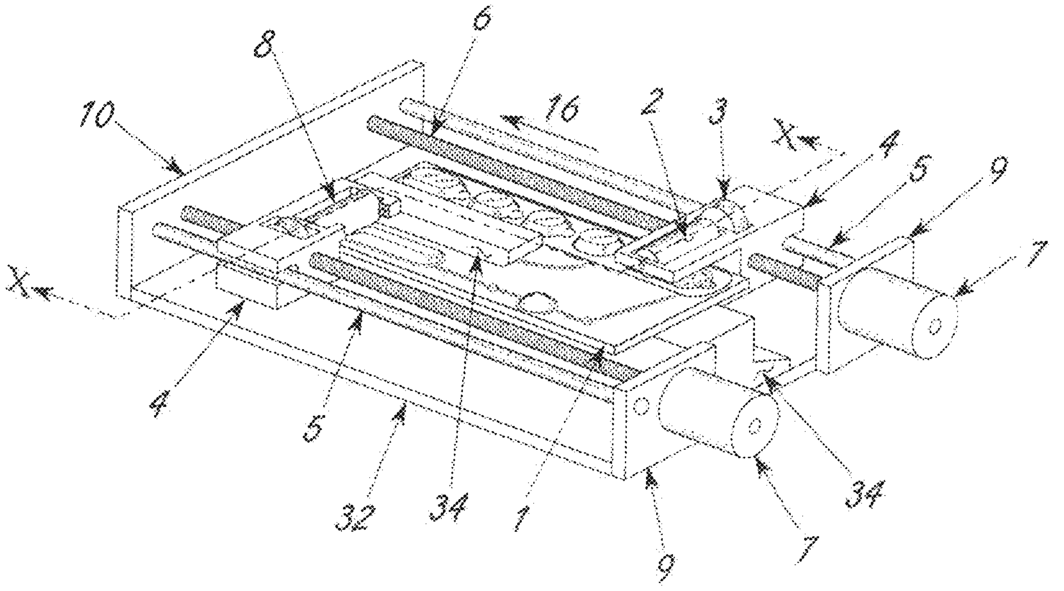
FIG. 2 is an isometric view of system comprising of a diagnostic cartridge interfacing with two linear actuators.

Referring in more detail to FIG. 2, the apparatus 1 is shown disposed within a nest cavity or receptacle, shown generally at 34, within a body of the actuator system 32, shown constructed in accordance with one aspect of the invention. The receptacle 34 can be configured as desired to ensure the apparatus 1 is releasably fixed in stationary manner within the actuator system 32. The actuator system 32 is shown, by way of example and without limitation, as including at least one, and shown as a plurality of motor support members or housings, also referred to as flanges 9 extending upwardly from the body of the system 32, wherein the flanges 9 can be formed separately or integrally, from the same piece of material, with the body. The flanges 9 operably support lead screw drive motors 7 which are operably coupled to and operably support corresponding lead screws 6. The lead screws 6 are supported by the body, shown at one end as being supported by the flange 9 and at an opposite end by an upstanding flange or wall 10 of the actuator body. It will be readily appreciated that the end of the lead screw 6 supported by the body wall 10 can be supported for rotation within a journal bearing, if desired. Regardless, the lead screw 6 is supported for driven rotation via the drive motors 7, wherein the lead screw 6 passes through threaded through openings or bores 38 of corresponding actuator carriages 4 for threaded, meshed driving engagement therewith. Each carriage 4 is translatable along the longitudinal axis of the corresponding lead screw 6, in the direction of arrow 16, such that upon driving rotation of the selected lead screw 6 by selective actuation of the corresponding lead screw drive motor 7, the corresponding actuator carriage 4 is axially translated as a result of being threadedly coupled and engaged with the threads of the lead screw 6. The carriages 4 are prevented from rotating about the axis of the corresponding lead screw 6 extending therethrough as a result of being supported and directed by a guide rod 5 which acts to impart a counter force to the moment applied by the carriage 4. The guide rods 5 extend parallel to the lead screw 6 and are shown as being received in separate, generally U-shaped slots or passages 33 extending into an end of the corresponding carriage 4, though it is to be recognized that the U-shaped passages 33 could be replace with through openings, if desired.

Each carriage 4 carries a roller 2 in a window 35, shown by way of example as an upper roller 2 formed in an upper wall 37 of the carriage 4, wherein the upper roller 2 is rotatable about a longitudinal central axis and is axially and operably coupled to a driven member, shown as a driven gear 3, for direct rotation about the longitudinal central axis in direct response to rotation of the driven gear 3. The roller 2 has a relatively high friction outer surface to grip and roll over the underlying cartridge 1 such that as the blister(s) 11 is being compressed by the roller 2, the material of the blister 11 does not slide or otherwise get pushed axially, but rather, the material of the blister is gripped by the roller 2 to ensure proper compressing activation thereof. The roller 2 can be formed of a compliant polymeric material having a relatively gummy high friction surface, including various types of rubber. The roller 2 can also be formed of a metallic material, as long the outer surface is provided with a gripping, high friction surface, such as via a bead-blasting process, or otherwise. The driven gear 3 is in meshed engagement with a helical thread of the lead screw 6, such that upon rotation of the lead screw 6, the driven gear 3 causes conjoint rotational motion of the upper roller 2. With the driven gear 3 rotating and axially translating along the length of the lead screw 6, the carriage 4, and roller 2 supported thereby, interface with apparatus 1 and selectively impart mechanical displacement of the fluid-containing blisters 11 (FIG. 1, blister 2 shown as being at least partially crushed or depressed), along with selective actuation of other features shown in the figures.

Figure 3:
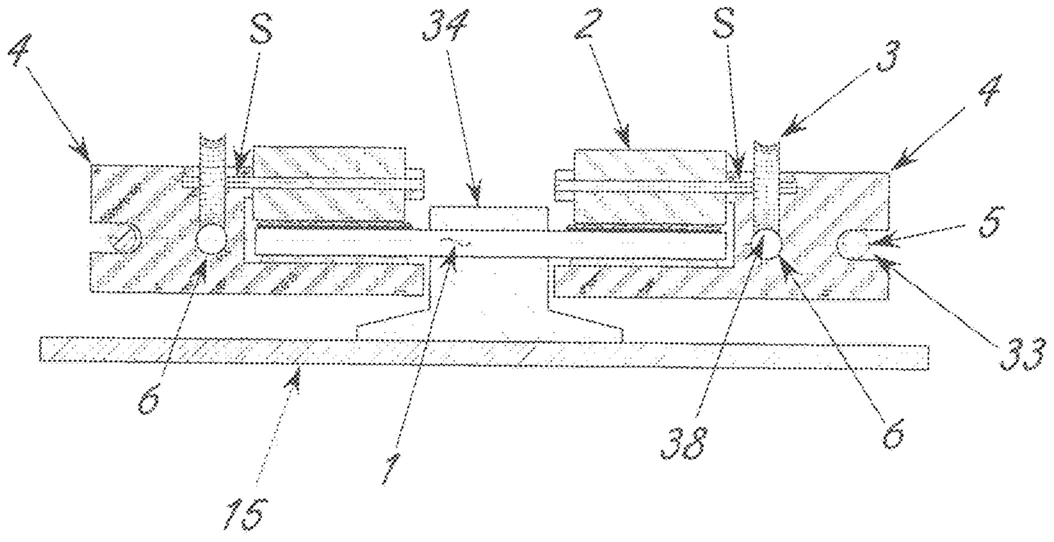
FIG. 3 is a cross-sectional view taken generally through line X-X of FIG. 2, of the system containing a diagnostic cartridge and two linear actuators in the direction of carriage travel.

Referring in more detail to FIG. 3, a cross-section taken generally along the line X-X of FIG. 2 is shown, with a pair of actuator carriages 4 and associated components, each including the upper roller 2, which, as discussed above, are driven by the respective driven gear 3 that is operably coupled in meshed engagement with the respective lead screw 6. In turn, the driven gear 3 is coupled in fixed, direct driving relation with the upper roller 2 via a common shaft S that is fixed to the drive gear 3 and upper roller 2. Accordingly, the upper roller 2 rotates conjointly with the driven gear 3 upon rotation of the lead screw 6 and axial translation of the actuator carriage 4 along the lead screw 6, whereupon the roller 2 selectively rolls over and depresses components along the axis of travel.

Figure 4:
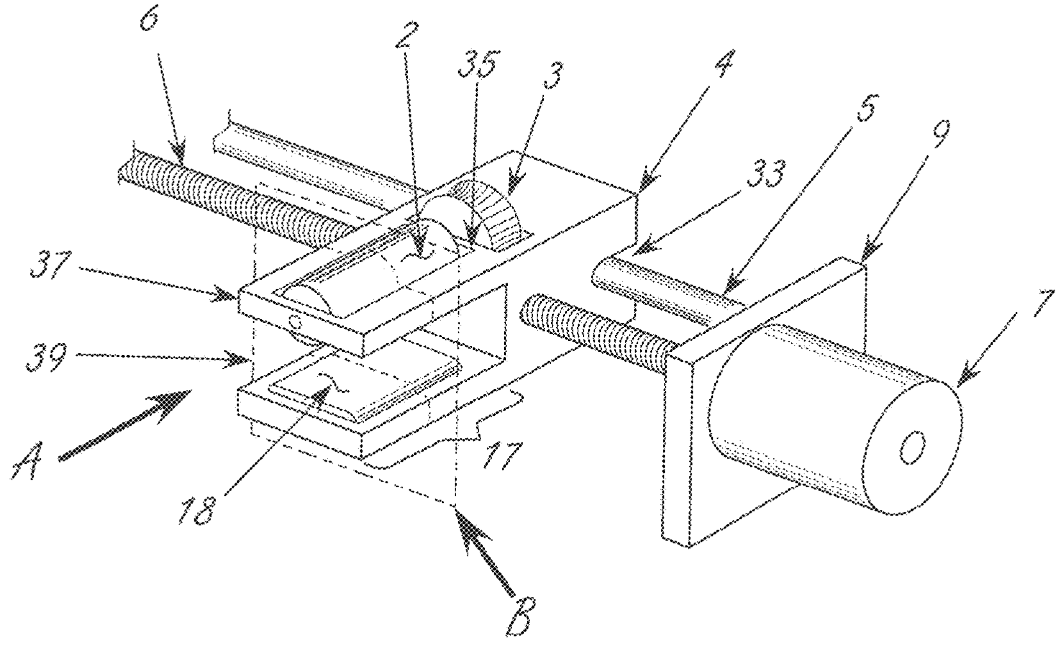
FIG. 4 is an isometric view of a roller with opposing support plate.

Referring in more detail to FIG. 4, an isometric view of one of the actuator carriages 4 is shown, including the upper roller 2, operably coupled to the driven gear 3, contained and carried within the actuator carriage 4. The actuator carriage 4 includes a lower wall, also referred to as base portion, and referred to hereafter simply as base 17, containing a support plate 18 of low friction material, such as glass filled Delrin® or PTFE, by way of example and without limitation, opposed to and spaced a predetermined distance from the upper roller 2. A generally U-shaped cavity C is defined between the upper and lower walls 35, 17, respectively.

Figure 5:
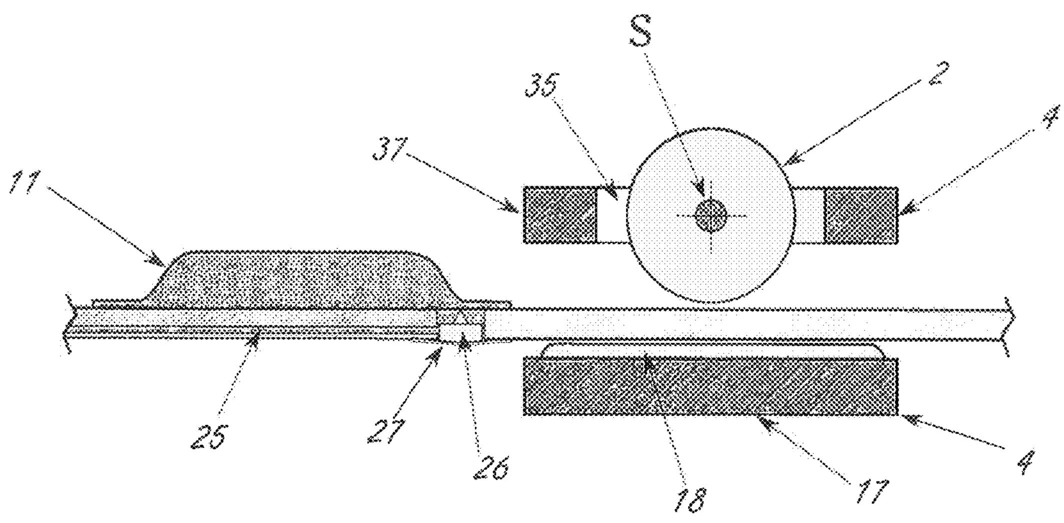
FIG. 5 is a cross sectional view in the direction of Arrow -A-, through Plane -B- of FIG. 4, depicting an un-opened blister containing fluid located above the section of a diagnostic cartridge (not shown in FIG. 4) and a blister opening device located below the diagnostic cartridge prior to actuation.

Referring in more detail to FIG. 5, a cross section through plane B and in the direction of arrow A of FIG. 4 is shown. The fluid-containing blister 11 is shown in a pre-opened, pre-actuated (before being compressed), closed state. The low friction support plate 18 is juxtaposed the bottom of the diagnostic cartridge 1 for abutment therewith, directly opposite and facing the upper roller 2 and spaced therefrom a predetermined distance, with the diagnostic cartridge 1 being sandwiched between the upper roller 2 and the low friction support plate 18. Accordingly, the lower wall 17 and support plate 18 thereon are spaced a predetermined distance from the roller 2 for receipt of the diagnostic cartridge 1 therebetween. The fluid-containing blister 11, shown in the sealed, closed-state, is located on an upper surface of the diagnostic cartridge 1, overlying a blister opening/pierce member, also referred to and shown, by way of example, as a pierce member 26. The blister opening member 26 is disposed within or adjacent the fluid channel 25 in fluid communication therewith, and is retained and sealed generally within the thickness of the diagnostic cartridge 1 between a lower or bottom surface of the blister 11 and a flexible membrane 27 underlying the pierce member 26. The flexible membrane 27 can be adhered or otherwise fixed, such as via a weld seam, to the bottom surface of the diagnostic cartridge 1 to maintain the blister opening member 26 in position for deployment, when desired.

Figure 6:
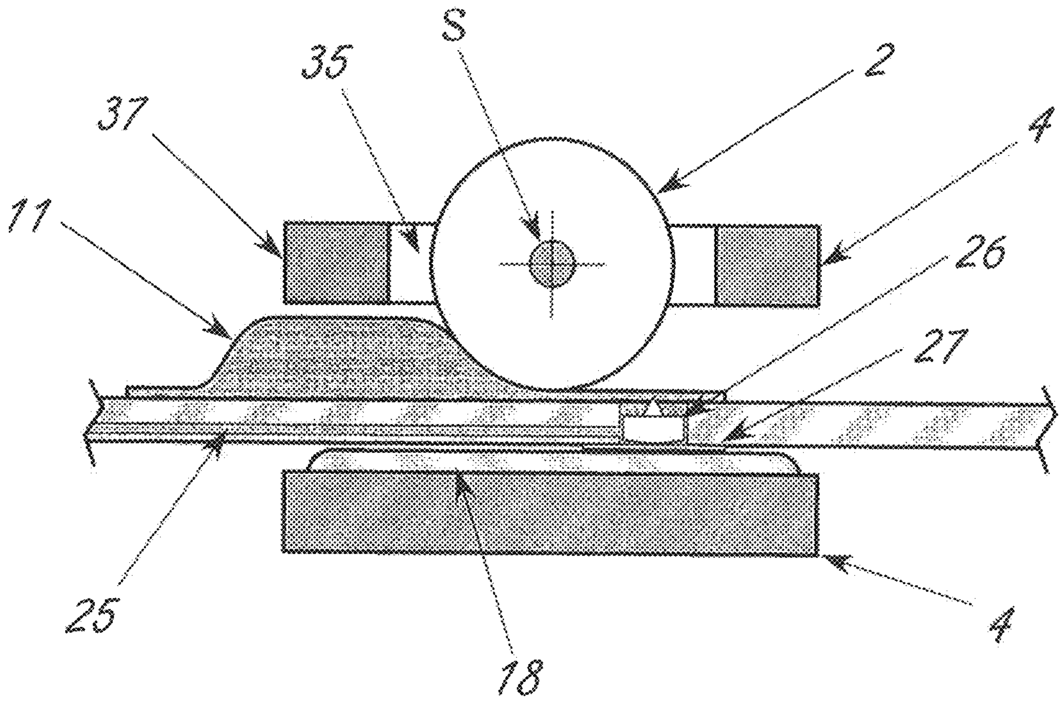
FIG. 6 is a cross sectional view in the direction of Arrow -A-, through Plane -B- of FIG. 4, depicting an opened blister containing fluid in a state of compression located above the section of a diagnostic cartridge (not shown in FIG. 4) and a blister opening device located below the diagnostic cartridge after actuation.

Referring in more detail to FIG. 6, a cross section through plane B and in the direction of arrow A of FIG. 4, shows the blister pierce member 26 having been selectively (intentionally) displaced into piercing engagement with a lower layer of the fluid-containing blister 11. The displacement of the blister pierce member 26 is brought on via a compressing interface between an upper surface of the low-friction support plate 18 and the downwardly applied force of the upper roller 2 on the fluid containing blister 11. During engagement of the fluid-containing blister 11 with the upper roller 2, the fluid-containing blister 11 undergoes deformation and compression under force applied by the upper roller 2 rolling thereover as the actuator carriage 4 translates in response to driving actuation of the lead screw 6 and driven gear 3. The blister pierce member 26 is caused to puncture or rupture the lower layer of the blister 11, thereby causing the fluid contents of the fluid-containing blister 11 to be forced, under pressure applied by the upper roller 2, into the fluid channel 25. The fluid is caused to flow about the pierce member 26 and through the channel 25 at a selective flow rate, whether constant or varied, by a selected rate of translation or linear travel of the carriage 4 and upper roller 2 operably coupled thereto, which can be readily altered, as desired, by the selected speed of rotation of the lead screw 6 as commanded by actuation of the lead screw drive motor 7. Accordingly, it is to be appreciated that the lead screw drive motor 7 can be actuated to impart a constant or variable rotational speed of the respective lead screw 6.

Figure 7:
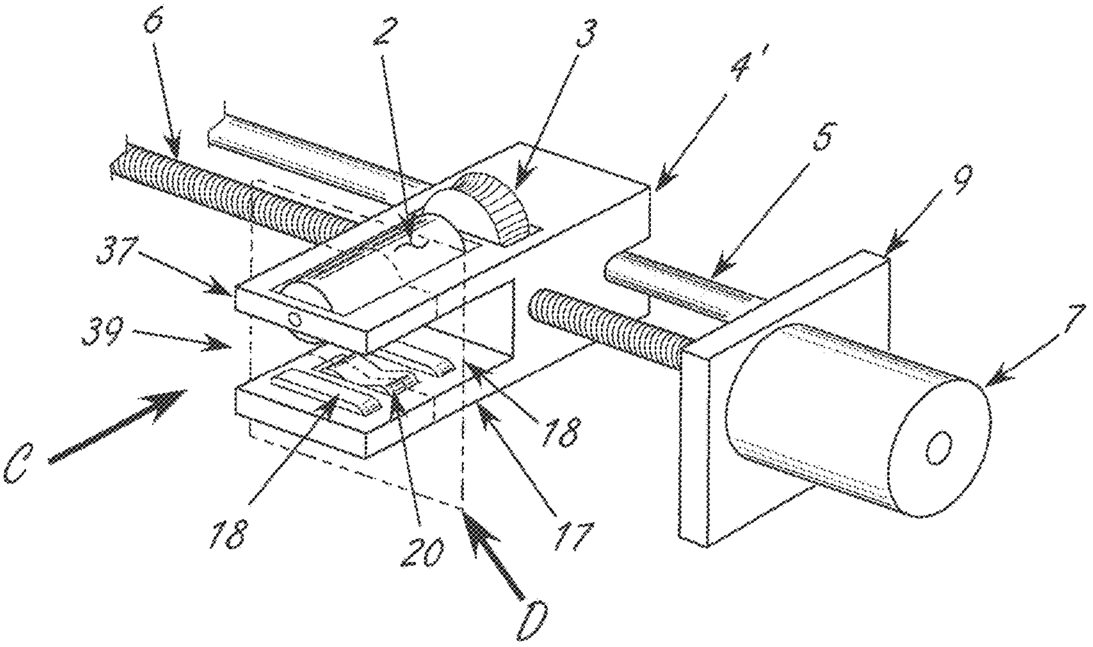
FIG. 7 is an isometric view of a roller with opposing support plate and toggle actuator.

Referring in more detail to FIG. 7, an isometric view of an actuator carriage 4' constructed in accordance with another aspect of the invention is shown. The actuator carriage 4' includes an upper roller 2 that is operably coupled to a roller driven gear 3, which in turn is operably coupled to a drive or lead screw 6 configured for rotatable actuation via a drive motor 7, as discussed above for the actuator carriage 4. The actuator carriage 4' has a base including a pivotal toggle actuator 20 located between two low-friction support plates 18 spaced laterally from one another.

Figure 8:
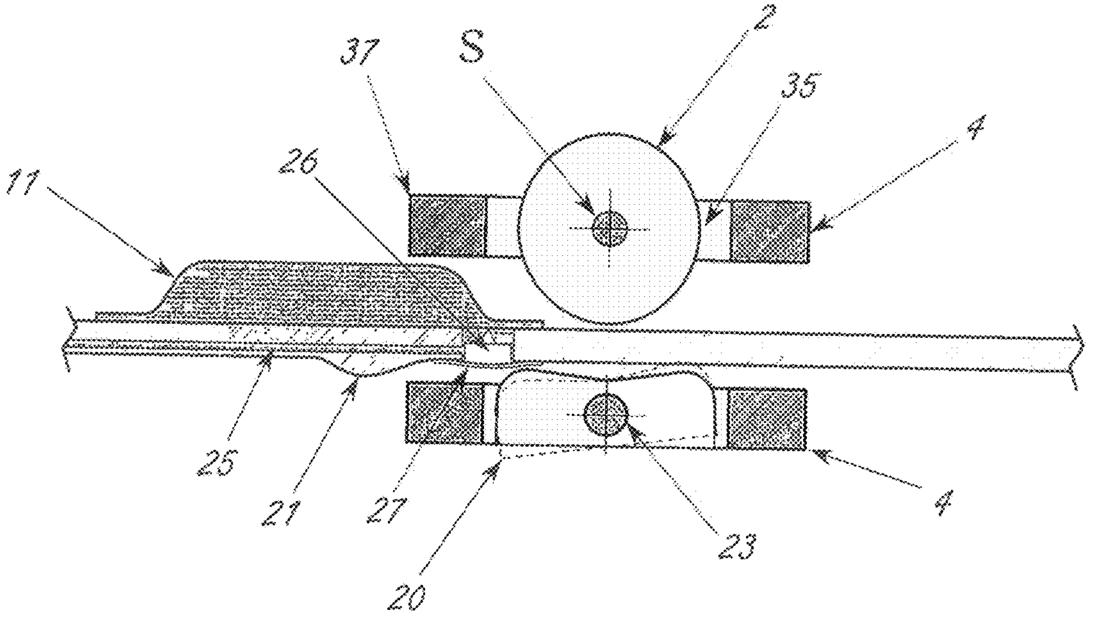
FIG. 8 is a cross sectional view in the direction of Arrow -C-, through Plane -D- of FIG. 7, depicting an un-opened blister containing fluid located above the section of a diagnostic cartridge (not shown in FIG. 7) and a blister opening device located below the diagnostic cartridge prior to actuation by a pivotal toggle.

Referring in more detail to FIG. 8, a cross section through plane D and in the direction of arrow C of FIG. 7 is shown. The fluid-containing blister 11 is shown in a pre-depressed, pre-opened, sealed state. The toggle actuator 20 is shown in the neutral, pre-actuated position. The toggled actuator 20 is supported for pivotal movement about a toggle pivot shaft 23. A blister pierce 26, configured to selectively open the fluid-containing blister 11, is retained and sealed within a fluid channel 25 by a flexible membrane 27 beneath a lower layer of the fluid-containing blister 11, as discussed above. A toggle lobe 21 is shown proximal to and in-line with (along an axis that the roller 2 and toggle actuator 20 traverse) the blister pierce 26 and the toggle actuator 20.

Figure 9:
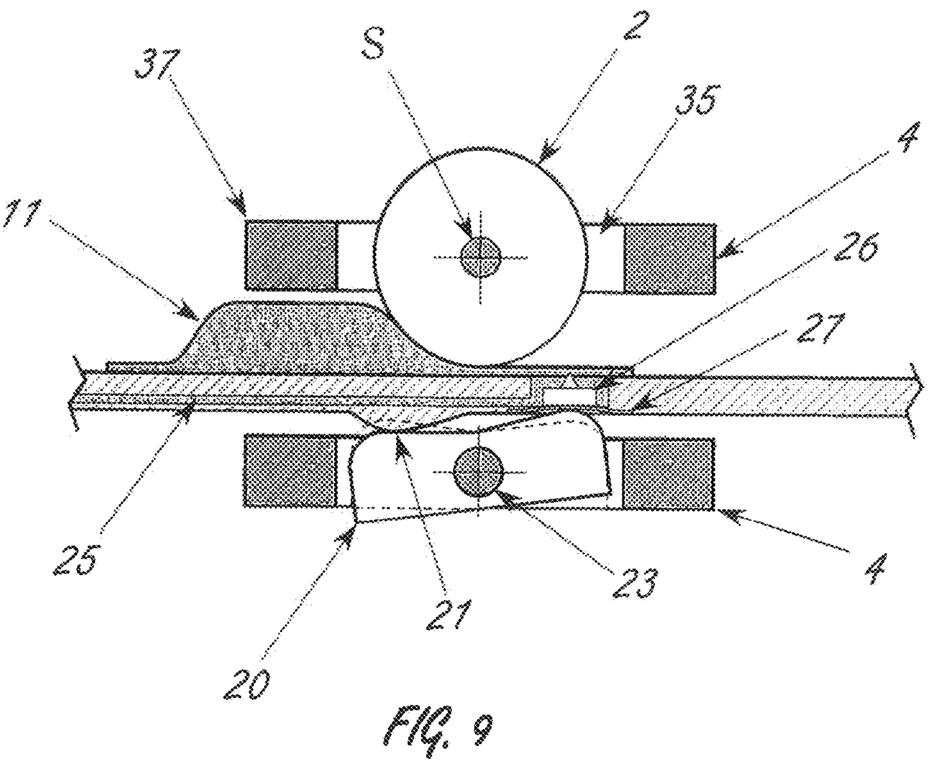
FIG. 9 is a cross sectional view in the direction of Arrow -C-, through Plane -D- of FIG. 7, depicting an opened blister containing fluid in a state of compression located above the section of a diagnostic cartridge (not shown in FIG. 7) and a blister opening device located below the diagnostic cartridge after actuation by a pivotal toggle.

Referring in more detail to FIG. 9, a cross section through plane B and in the direction of arrow A of FIG. 7 is again shown, wherein the carriage 4', with roller 2 and toggle actuator 20 carried thereby, has been linearly translated along the stationary diagnostic card or cartridge 1 via actuated rotation of the lead screw 6 imparted by selective actuation of the drive motor 7. The blister pierce 26 is shown having been displaced by the toggle actuator 20 into piercing engagement with the lower layer of the fluid-containing blister 11. The toggle actuator 20 is caused to pivot about the toggle pivot shaft 23 under a camming bias imparted by a bulbous toggle lobe 21. The toggle lobe 21 is operably fixed to a lower surface of the diagnostic cartridge 1 in line with the toggle actuator 20, wherein the toggle lobe 21 depends from the lower surface sufficiently to confront and engage the toggle actuator 20, thereby causing the toggle actuator 20 to pivot into piercing actuation with the lower layer of the fluid-containing blister 11. The fluid-containing blister 11 is shown undergoing compressed deformation by upper roller 2 rolling thereover as the actuator carriage 4' translates along the lead screw 6 and as the toggle lobe 21 engages the toggle actuator 20 to cause the blister 11 to be pierced by the blister pierce 26, thereby selectively forcing and mechanically pumping/urging the fluid contents of the blister 11, at the desired flow rate and volume, around the blister pierce 26 downstream into and through the fluid channel 25.

Figure 10:
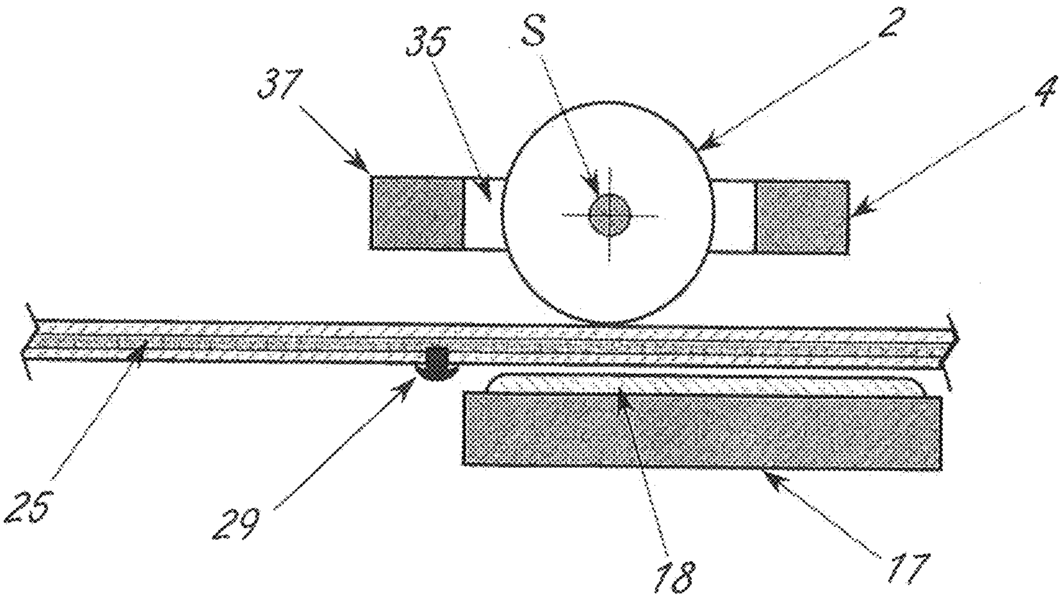
FIG. 10 is a cross sectional view in the direction of Arrow -A-, through Plane -B- of FIG. 4, depicting a roller with opposing support member and a valve member shown in an open position.
Figure 11:
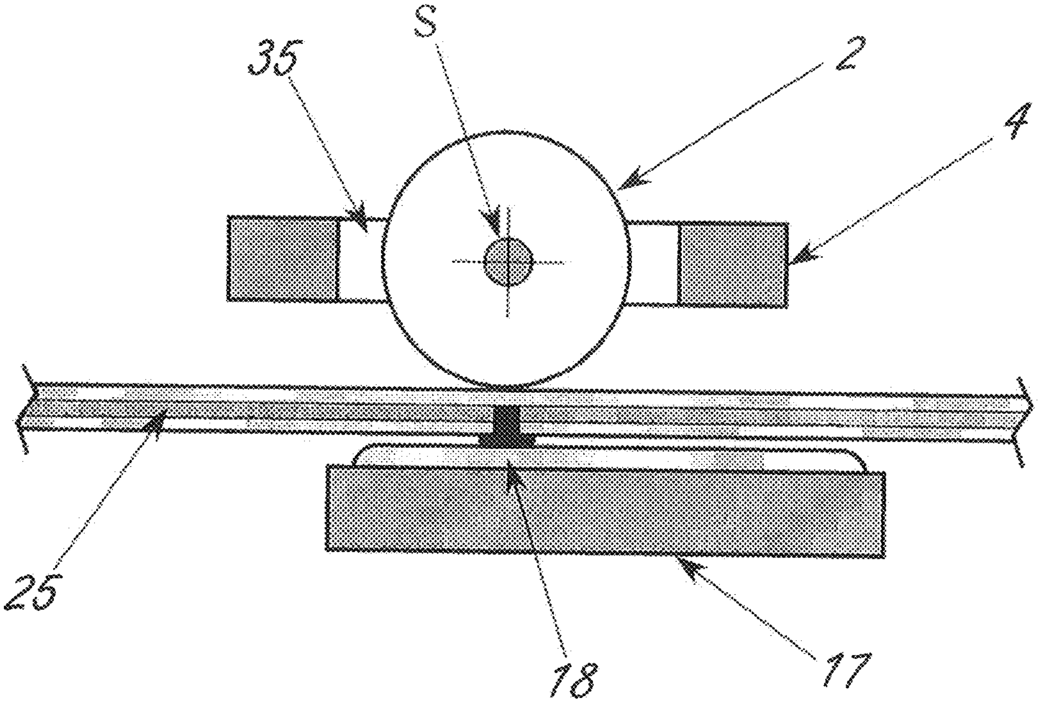
FIG. 11 is a view similar to FIG. 10 showing the valve member in a closed position.

Referring in more detail to FIG. 10, a cross section through plane D and in the direction of arrow C of FIG. 7 is yet again shown, with a lower convex surface of the upper roller 2 shown in engaging tangential relation to an upper surface of a diagnostic cartridge 1, and showing at least one of the low friction support plates 18 juxtaposed with the bottom surface of the diagnostic cartridge 1, opposite the upper roller 2 (it is to be recognized that the low friction support plates 18 are to be in close or abutting relation with the bottom surface of the diagnostic cartridge 1). A valve member, such as an elastically deformable valve 29, by way of example and without limitation, is shown, juxtaposed with or disposed within the fluid channel 25, in an un-actuated state in laterally offset relation from the roller 2 and lower friction support plate 18. As such, the valve member 29 is shown in an open and non-compressed, non-elastically deformed state, thereby allowing fluid to flow freely through the fluid channel 25. In contrast, as shown in FIG. 11, wherein the roller 2 and low friction support plate 18 are shown translated along the cartridge 1 relative to FIG. 10, the valve member 29 is disposed in alignment between the roller 2 and the support plate 18, thereby being compressed to an actuated, closed state within and occluding the fluid channel 25. Accordingly, fluid is no longer able to flow through the channel 25 as long as the valve member 29 remains in the closed state. It will be recognized by one skilled in the art that the minimum distance between the lowermost convex surface of the roller 2 and the uppermost surface of the low friction support plate 18 can allow for slight clearance relative to the upper and lower surfaces of the diagnostic cartridge, thereby minimizing friction therewith; however, the minimum distance is such that full actuation of the valve member 29 is attained, as desired, when the low friction support plate 18 is engaged with the valve member 29.

Figure 12:
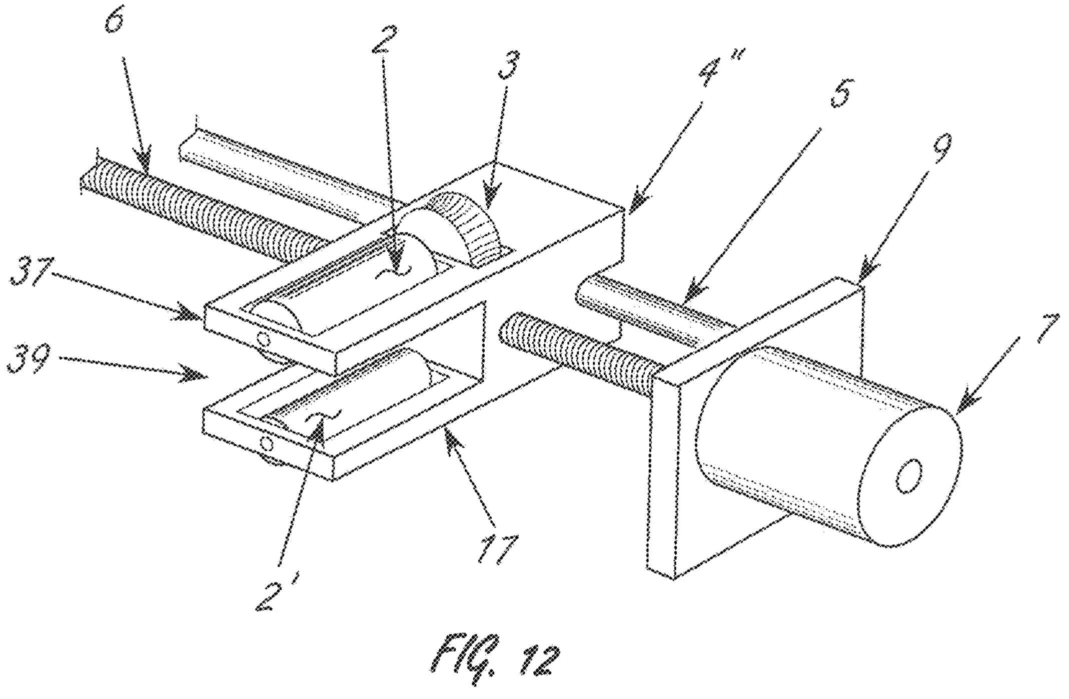
FIG. 12 is an isometric view of a carriage having a driven roller with opposing roller.

Referring in more detail to FIG. 12, an isometric view of an actuator carriage 4" constructed in accordance with another aspect of the invention is shown. The actuator carriage 4" has a driven upper roller 2, operably coupled to roller driven gear 3, contained within actuator carriage 4", and a lower roller 2' opposite the upper roller 2. The lower roller 2' can be constructed as a driven, passive roller, or as a drive, active roller, as desired. If constructed as an active, drive roller, the lower roller 2' can be driven from a similar gear as shown and discussed for the driven gear 3. Otherwise, the lower roller 2' can remain passive, such that it freely rotates in idler fashion in response to relative movement between the diagnostic card 1 and the carriage 4".

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A mechanical actuator system for performing an assay on a disposable diagnostic cartridge having a plurality of fluid-containing blisters, comprising:

a body having a base and a pair of support flanges extending upwardly from said base in spaced relation from one another, said body being configured to carry the disposable diagnostic cartridge in stationary relation thereon;

at least one lead screw extending between opposite ends, one of said opposite ends being operably supported by one of said flanges and the other of said opposite ends being operably supported by the other of said flanges;

a drive motor operably connected to one of said opposite ends of said at least one lead screw;

at least one carriage threadedly coupled to a respective one of said at least one lead screw;

at least one roller operably carried by said at least one carriage for rotation to compress at least one of the fluid-containing blisters on the diagnostic cartridge; and a driven gear operably coupled to said at least one roller for conjoint rotation therewith, said driven gear being configured in meshed engagement with one of said at least one lead screw, wherein actuation of said drive motor causes said at least one lead screw to rotate, thereby causing said at least one carriage to translate along said at least one lead screw and concurrently causing said driven gear and said at least one roller to rotate.

2. The mechanical actuator system of claim 1, wherein said at least one carriage has a window sized for receipt of said roller therein.

3. The mechanical actuator system of claim 1, wherein said at least one carriage has a slot and further comprising a guide rod received in said slot, said guide rod extending parallel with said at least one lead screw and countering rotational forces imparted on said at least one carriage by said lead screw extending therethrough.

4. The mechanical actuator system of claim 3, wherein said guide rod has opposite ends supported by said support flanges.

5. The mechanical actuator system of claim 1, wherein said carriage has upper and lower walls spaced from one another by a U-shaped cavity, said window being formed in said upper wall, with said roller being spaced from said lower wall for receipt of the disposable diagnostic cartridge between said roller and said lower wall.

6. The mechanical actuator system of claim 5, further comprising a low friction material disposed on said lower wall, said low friction material facing said roller for receipt of the disposable diagnostic cartridge between said roller and said low friction material.

7. The mechanical actuator system of claim 5, further comprising a toggle actuator pivotally supported on said lower wall for operable pivotal engagement with a toggle lobe and a blister pierce member on the disposable diagnostic cartridge.

8. The mechanical actuator system of claim 1, wherein said at least one roller includes a pair of rollers operably carried by said at least one carriage.

9. A mechanical actuator system for performing an assay on a disposable diagnostic cartridge having a plurality of fluid-containing blisters, comprising:

a body configured to carry the disposable diagnostic cartridge in stationary relation thereon;

at least one lead screw operably supported by said body;

a drive motor operably connected to said at least one lead screw;

a carriage threadedly coupled to said lead screw, said carriage having upper and lower wall spaced from one another;

a roller operably carried by said upper wall of said carriage, said roller being in spaced relation from said lower wall for passage of the diagnostic cartridge between said roller and said lower wall; and a driven gear operably coupled to said roller, said driven gear being configured in meshed engagement with said lead screw, wherein actuation of said drive motor causes said lead screw to rotate, thereby causing said carriage to translate along said lead screw and concurrently causing said driven gear to rotate said roller.

10. The mechanical actuator system of claim 9, wherein said carriage has a through window formed in said upper wall, said window being sized for receipt of said roller therein.

11. The mechanical actuator system of claim 9, wherein said carriage has a slot and further comprising a guide rod received in said slot, said guide rod countering rotational forces imparted on said carriage by said lead screw.

12. The mechanical actuator system of claim 9, further comprising a low friction material disposed on said lower wall, said low friction material facing said roller for receipt of the disposable diagnostic cartridge between said roller and said low friction material.

13. The mechanical actuator system of claim 9, further comprising a toggle actuator pivotally supported on said lower wall for operable pivotal engagement with a toggle lobe and a blister pierce member on the disposable diagnostic cartridge.

* * * * *